(12) United States Patent
Milton et al.

(10) Patent No.: US 10,661,680 B2
(45) Date of Patent: May 26, 2020

(54) ELECTRIC UTILITY TERRAIN VEHICLE

(71) Applicant: Nikola Corporation, Phoenix, AZ (US)

(72) Inventors: Trevor R. Milton, Phoenix, AZ (US); Kevin M. Lynk, Phoenix, AZ (US); Anthony A. Heaton, Phoenix, AZ (US); Morgan Mackelprang, Phoenix, AZ (US); Kyle Gray, Phoenix, AZ (US); Robert Dane Davis, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 16/401,449

(22) Filed: May 2, 2019

(65) Prior Publication Data
US 2019/0255957 A1 Aug. 22, 2019

Related U.S. Application Data

(63) Continuation of application No. 15/268,249, filed on Sep. 16, 2016, now Pat. No. 10,308,132.
(Continued)

(51) Int. Cl.
*B60L 58/26* (2019.01)
*B60K 1/04* (2019.01)
(Continued)

(52) U.S. Cl.
CPC .............. *B60L 58/26* (2019.02); *B60K 1/04* (2013.01); *B60K 7/0007* (2013.01); *B60K 17/12* (2013.01);
(Continued)

(58) Field of Classification Search
CPC ......... B60L 50/64; B60L 50/66; B60L 58/26; B60L 1/00; B60L 1/14; B60L 8/003;
(Continued)

(56) References Cited

U.S. PATENT DOCUMENTS

| 5,501,289 A | 3/1996 | Nishikawa et al. |
| 6,190,795 B1 | 2/2001 | Daley |

(Continued)

FOREIGN PATENT DOCUMENTS

| CN | 201243042 | 5/2009 |
| DE | 102008034875 | 1/2010 |

(Continued)

OTHER PUBLICATIONS

AUIPO; Notice of Acceptance dated Oct. 28, 2019 in AU Application No. 2017262676.
(Continued)

*Primary Examiner* — Paul N Dickson
*Assistant Examiner* — Hilary L Johns
(74) *Attorney, Agent, or Firm* — Snell & Wilmer L.L.P.

(57) ABSTRACT

A utility task vehicle (UTV) includes a frame having frame rails and a battery assembly positioned laterally between the frame rails. The battery assembly includes a battery housing and a battery array having a plurality of battery cells. The battery array is positioned within the battery housing and the battery assembly provides support for or is located under a floor of a cabin of the utility task vehicle.

18 Claims, 17 Drawing Sheets

Related U.S. Application Data

(60) Provisional application No. 62/333,722, filed on May 9, 2016.

(51) Int. Cl.

| | | |
|---|---|---|
| *B60K 17/12* | (2006.01) | |
| *B60K 7/00* | (2006.01) | |
| *B60K 17/356* | (2006.01) | |
| *B60L 1/00* | (2006.01) | |
| *B60L 1/14* | (2006.01) | |
| *B60L 8/00* | (2006.01) | |
| *B60L 50/60* | (2019.01) | |
| *B60L 50/64* | (2019.01) | |
| *B60K 1/00* | (2006.01) | |
| *B60K 11/02* | (2006.01) | |

(52) U.S. Cl.
CPC ............ *B60K 17/356* (2013.01); *B60L 1/00* (2013.01); *B60L 1/14* (2013.01); *B60L 8/003* (2013.01); *B60L 50/64* (2019.02); *B60L 50/66* (2019.02); *B60K 11/02* (2013.01); *B60K 2001/005* (2013.01); *B60K 2001/006* (2013.01); *B60K 2001/0438* (2013.01); *B60K 2007/0046* (2013.01); *B60K 2007/0061* (2013.01); *B60L 2270/145* (2013.01); *B60Y 2200/124* (2013.01); *B60Y 2200/20* (2013.01); *B60Y 2306/01* (2013.01); *Y02T 10/705* (2013.01); *Y02T 10/7005* (2013.01); *Y02T 10/7083* (2013.01)

(58) Field of Classification Search
CPC ... B60L 2270/145; B60K 1/04; B60K 7/0007; B60K 17/12; B60K 17/356; B60K 11/02; B60K 2001/005; B60K 2001/006; B60K 2001/0438; B60K 2007/0046; B60K 2007/0061; B60Y 2200/124; B60Y 2200/20; B60Y 2306/01; Y02T 10/7005; Y02T 10/705; Y02T 10/7083
USPC ......................................................... 180/65.6
See application file for complete search history.

(56) References Cited

U.S. PATENT DOCUMENTS

| | | | |
|---|---|---|---|
| 6,465,123 B1 | 10/2002 | Baumann et al. | |
| 8,640,800 B2 * | 2/2014 | Armbruster | B60K 7/0007 |
| | | | 180/65.6 |
| 8,640,801 B2 * | 2/2014 | Hennings | B60K 7/0007 |
| | | | 180/65.6 |
| 8,739,907 B2 * | 6/2014 | Storc | B60K 1/04 |
| | | | 180/68.5 |
| 8,905,423 B2 | 12/2014 | Hart | |
| 8,960,341 B2 * | 2/2015 | Weber | B60L 50/51 |
| | | | 180/65.7 |
| 9,283,837 B1 | 3/2016 | Rawlinson | |
| 2006/0220405 A1 | 10/2006 | Ohe et al. | |
| 2007/0087266 A1 | 4/2007 | Bourke et al. | |
| 2008/0133470 A1 | 6/2008 | Day et al. | |
| 2008/0233470 A1 | 9/2008 | Zhu et al. | |
| 2009/0014223 A1 * | 1/2009 | Jones | B60K 17/16 |
| | | | 180/65.8 |
| 2011/0045334 A1 | 2/2011 | Meintschel et al. | |
| 2011/0168468 A1 * | 7/2011 | Taguchi | B60K 1/02 |
| | | | 180/65.245 |
| 2012/0028099 A1 | 2/2012 | Aoki | |
| 2012/0040237 A1 | 2/2012 | Hamada et al. | |
| 2012/0090907 A1 * | 4/2012 | Storc | B60K 1/04 |
| | | | 180/68.5 |
| 2013/0062939 A1 | 3/2013 | Engler et al. | |
| 2013/0135880 A1 * | 5/2013 | Michie | B60Q 1/2611 |
| | | | 362/459 |
| 2013/0157098 A1 | 6/2013 | McLaughlin | |
| 2013/0284528 A1 | 10/2013 | Kawasaki et al. | |
| 2015/0111074 A1 | 4/2015 | Boddakayala et al. | |
| 2015/0135939 A1 | 5/2015 | Rawlinson | |
| 2016/0039277 A1 * | 2/2016 | Falls | B60K 1/02 |
| | | | 180/62 |
| 2016/0214475 A1 | 7/2016 | Rawlinson | |
| 2017/0324128 A1 | 11/2017 | Milton et al. | |
| 2018/0261899 A1 | 9/2018 | Milton et al. | |

FOREIGN PATENT DOCUMENTS

| | | |
|---|---|---|
| DE | 102010014081 | 10/2011 |
| WO | 2017004078 | 1/2017 |
| WO | 2017196799 | 11/2017 |
| WO | 2017196801 | 11/2017 |

OTHER PUBLICATIONS

AUIPO; Notice of Acceptance dated Feb. 28, 2020 in Application No. 2017262678.
AUIPO; Office Action dated Oct. 8, 2019 in AU Application No. 2017262676.
AUIPO; Office Action dated Dec. 2, 2019 in AU Application No. 2017262678.
AUIPO; Office Action dated May 20, 2019 in AU Application No. 2017262676.
CAIPO; Notice of Allowance dated Sep. 24, 2019 in CA Application No. 3023462.
CAIPO; Office Action dated Dec. 30, 2019 in CA Application No. 3023464.
EUIPO; Extended Search Report dated Jan. 28, 2020 in EU Application No. 17796663.7.
JPO; Notice of Allowance dated Dec. 24, 2019 in JP Application No. 2018-559974.
USPTO; Final Office Action dated Apr. 16, 2019 in U.S. Appl. No. 15/294,258.
USPTO; Final Office Action dated Sep. 6, 2018 in U.S. Appl. No. 15/268,249.
USPTO; Non-Final Office Action dated Nov. 26, 2018 in U.S. Appl. No. 15/294,258.
USPTO; Non-Final Office Action dated Jan. 12, 2018 in U.S. Appl. No. 15/268,249.
USPTO; Non-Final Office Action dated Apr. 16, 2019 in U.S. Appl. No. 15/904,968.
USPTO; Notice of Allowance dated Jan. 16, 2020 in U.S. Appl. No. 15/904,968.
USPTO; Notice of Allowance dated Jan. 18, 2019 in U.S. Appl. No. 15/268,249.
USPTO; Notice of Allowance dated Aug. 5, 2019 in U.S. Appl. No. 15/294,258.
IB; International Search Roport dated Sep. 28, 2017 in Application No. PCT/US17/31683.
IB; International Search Report dated Sep. 25, 2017 in Application No. PCT/US17/31687.

* cited by examiner

ELECTRIC UTILITY TERRAIN VEHICLE

CROSS-REFERENCE TO RELATED APPLICATIONS

This application is a continuation of U.S. patent application Ser. No. 15/268,249 filed Sep. 16, 2016, now U.S. Pat. No. 10,308,132 entitled "ELECTRIC UTILITY TERRAIN VEHICLE." U.S. patent application Ser. No. 15/268,249 claims priority to and the benefit of U.S. Provisional Application No. 62/333,722 filed May 9, 2016 entitled "SYSTEMS, METHODS AND DEVICES FOR A UTILITY TERRAIN VEHICLE." The disclosures of all the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The disclosure relates generally to systems, methods, and devices for a utility terrain vehicle or a side-by-side automobile.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. The features and advantages of the disclosure will become apparent from consideration of the description and accompanying drawings where.

DETAILED DESCRIPTION

Figure 1:
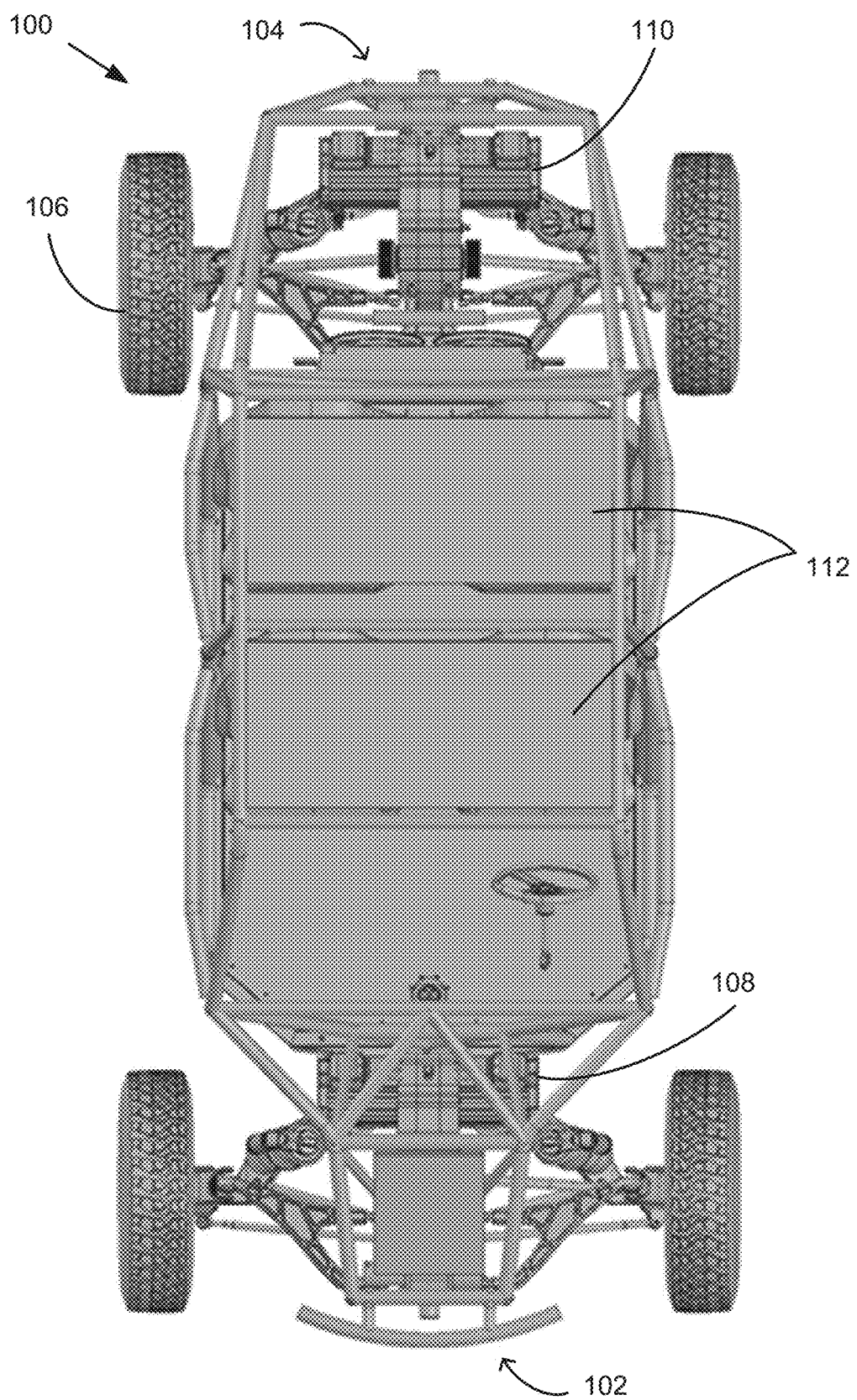
FIG. 1 is a top view of an embodiment of a UTV, side-by-side automobile made in accordance with the teachings and principles of the disclosure.

The disclosure relates generally to systems, methods, and devices for a utility terrain vehicle or a utility task vehicle (UTV). UTVs generally include vehicles in which a user and/or a passenger ride in a sitting position on a chair or seat and that is used for utility, off-road, or other purposes. The term UTV as used herein is given to include vehicles known as side-by-sides, recreational off-highway vehicles (ROVs), multipurpose off-highway utility vehicle (MOHUVs), and the like. UTVs may be considered more comfortable for riding than all-terrain vehicles (ATVs), such as four wheelers, due to their seated position. Although UTVs are generally smaller than road or highway vehicles they often have increased passenger or payload capacity over ATVs while maintaining a lower weight and/or lower center of gravity than highway vehicles.

Applicant has developed, and herein discloses, systems, methods and devices for an electric UTV. Specifically, Applicant has recognized a need for and developed systems, methods, and devices for an electric UTV. In one embodiment, the UTV includes a frame and a battery assembly. The frame includes two or more frame rails and the battery assembly is positioned laterally between the frame rails. The battery assembly includes a battery housing and a battery array that includes a plurality of battery cells. The battery array is positioned within the battery housing. In one embodiment, the battery assembly provides structural support for a floor of a cabin of the utility task vehicle. In one embodiment, the battery assembly is located under a floor of a cabin of the utility task vehicle.

The battery assembly located laterally with the frame or frame rails may allow for a larger battery and a lower center of gravity for the UTV. For example, the battery assembly may be positioned horizontally between one or more frame rails and thereby be positioned below a cabin, such as below the feet of a passenger of the UTV. The area between the frame rails and/or below the cabin may provide a volume for a large battery array to improve power output, performance, and time between recharges. In one embodiment, the battery assembly provides an output voltage of 400 volts to improve performance.

According to one embodiment, a UTV includes a motor gearbox assembly. The motor gearbox assembly includes a housing, a first motor, a second motor, a first gearbox, and a second gearbox. The first gearbox is configured to receive input from the first motor and provide output to a first output corresponding to a first wheel. The second gearbox is configured to receive input from the second motor and provide output to a second output corresponding to a second wheel. The first motor, second motor, first gearbox, and second gearbox are housed within the housing. In one embodiment, the motor gearbox assembly includes a cooling loop or cooling system that is common to and used to cool the first and second motors and first and second gearboxes. The positioning of the plurality of motors and gearboxes with independent outputs reduces the space requirements for the motors and gearboxes while also allowing the motors and gearboxes to be commonly cooled. The reduced size and complexity also allows for greater room for suspension so that higher quality suspension with increased travel is possible.

In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

It is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting.

In describing the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps. As used herein, the phrase "consisting of" and grammatical equivalents thereof exclude any element, step, or material not specified in the claim. As used herein, the phrase "consisting essentially of" and grammatical equivalents thereof limit the scope of a claim to the specified materials or steps and those that do not materially affect the basic and novel characteristic or characteristics of the claimed disclosure.

Figure 2:
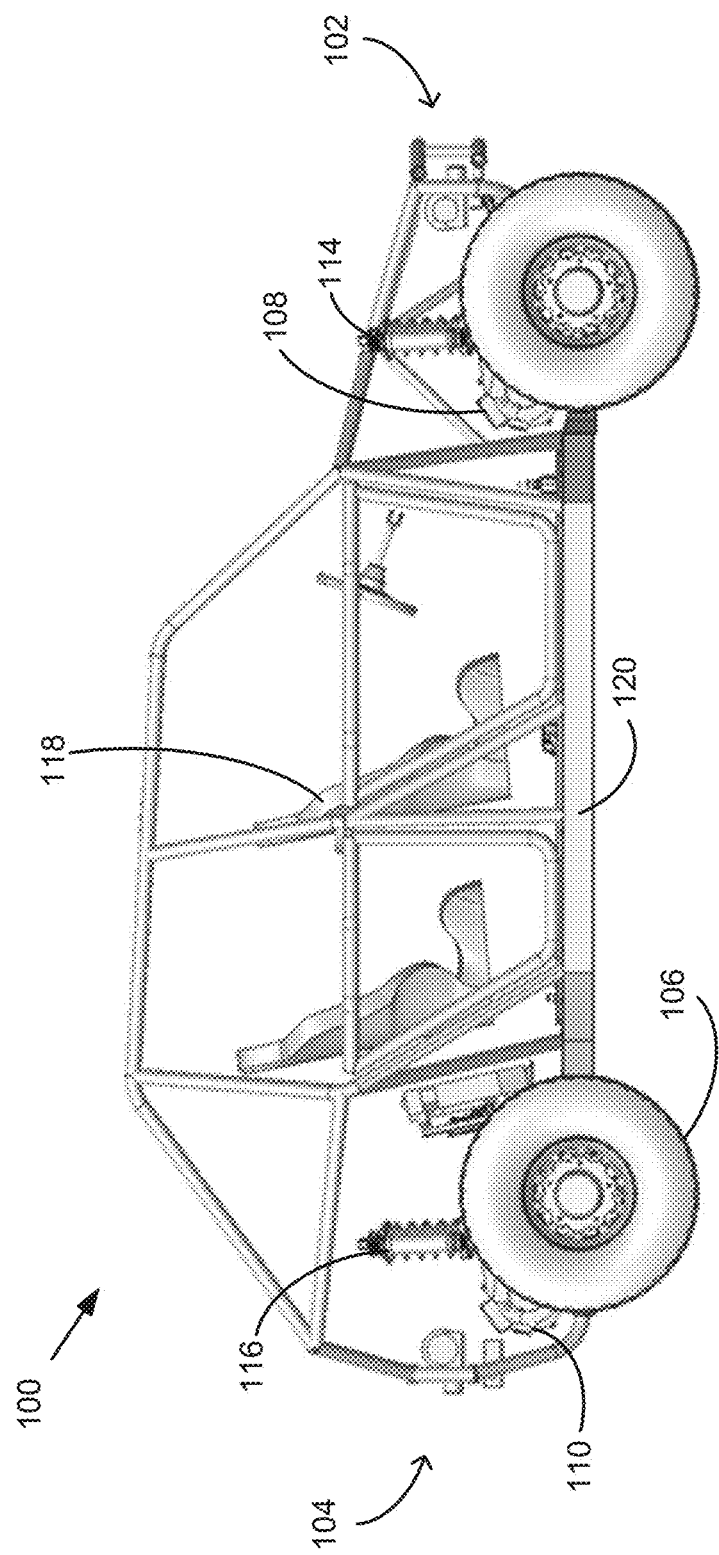
FIG. 2 is a side view of an embodiment of a UTV, side-by-side automobile made in accordance with the teachings and principles of the disclosure.
Figure 3:
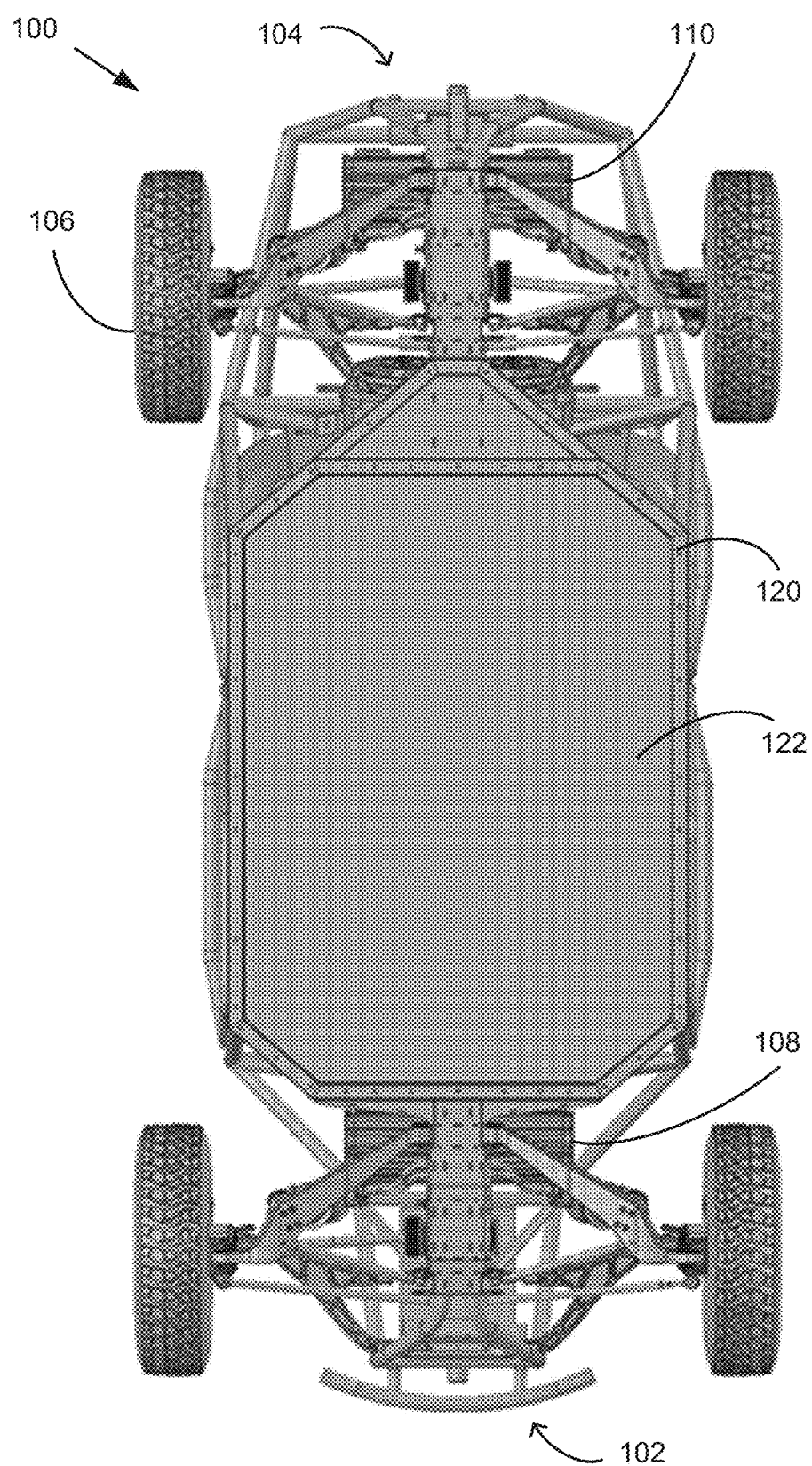
FIG. 3 is a bottom view of an embodiment of a UTV, side-by-side automobile made in accordance with the teachings and principles of the disclosure.
Figure 4:
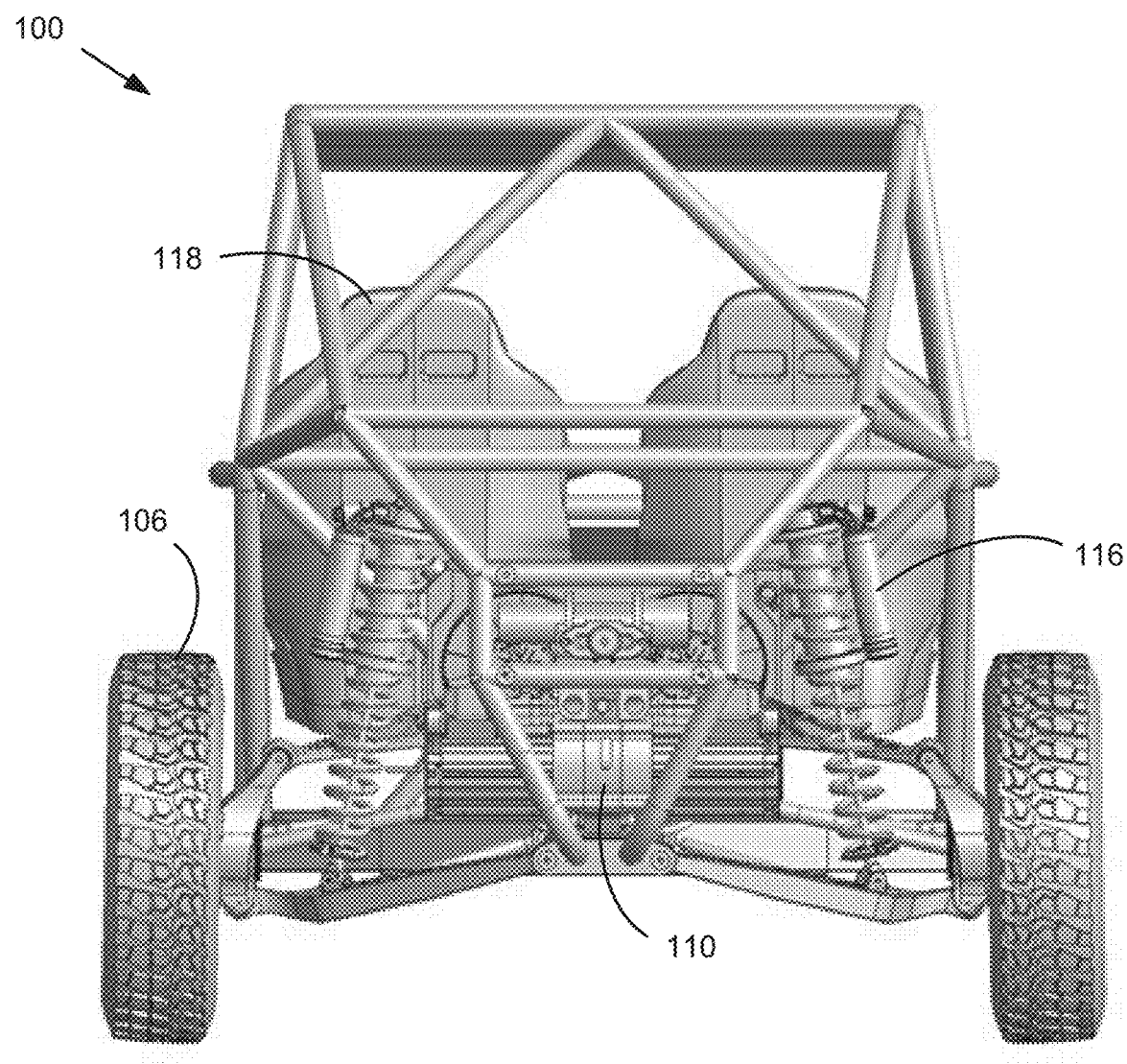
FIG. 4 is a rear view of an embodiment of a UTV, side-by-side automobile made in accordance with the teachings and principles of the disclosure.
Figure 5:
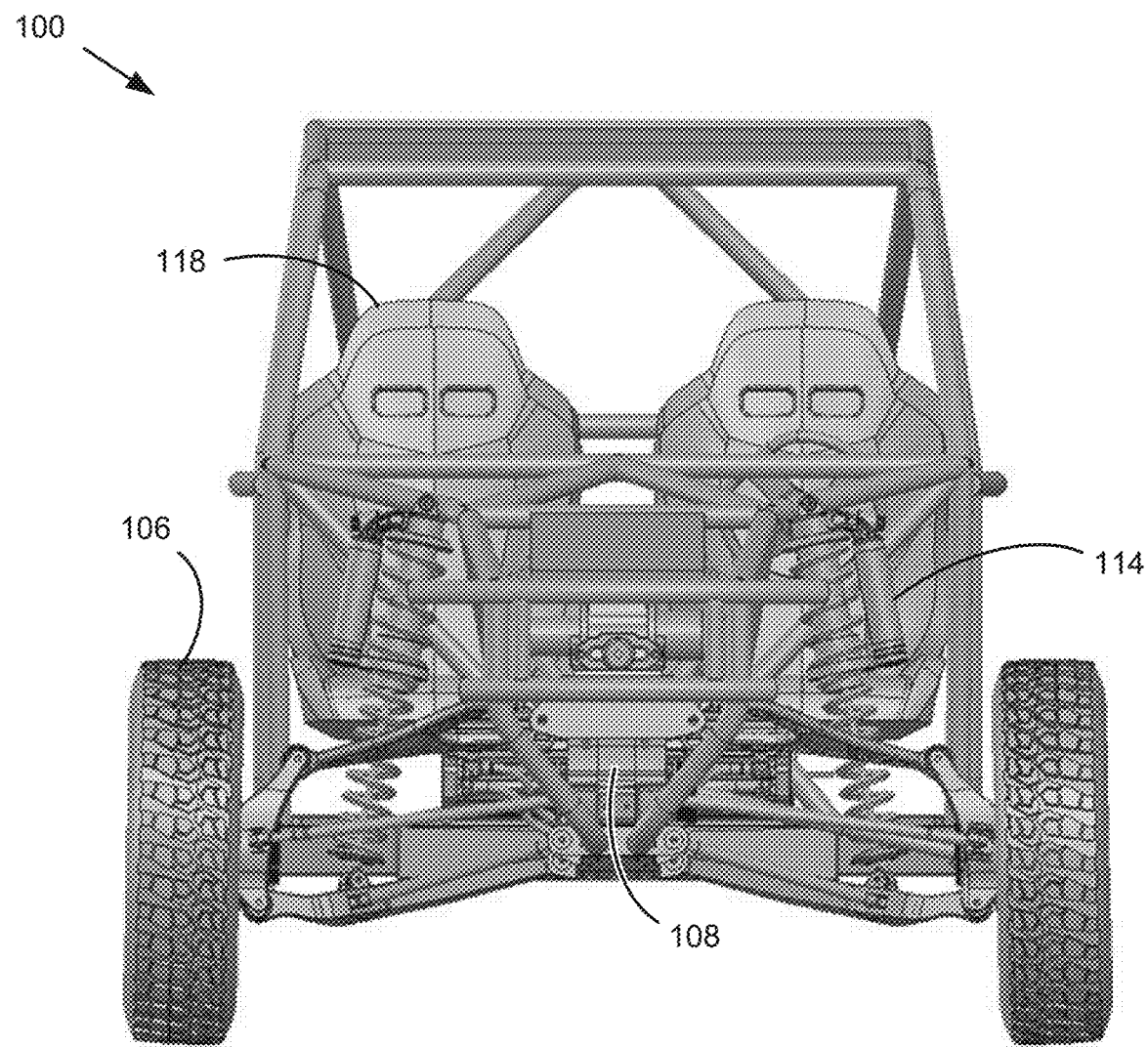
FIG. 5 is a front view of an embodiment of a UTV, side-by-side automobile made in accordance with the teachings and principles of the disclosure.
Figure 6:
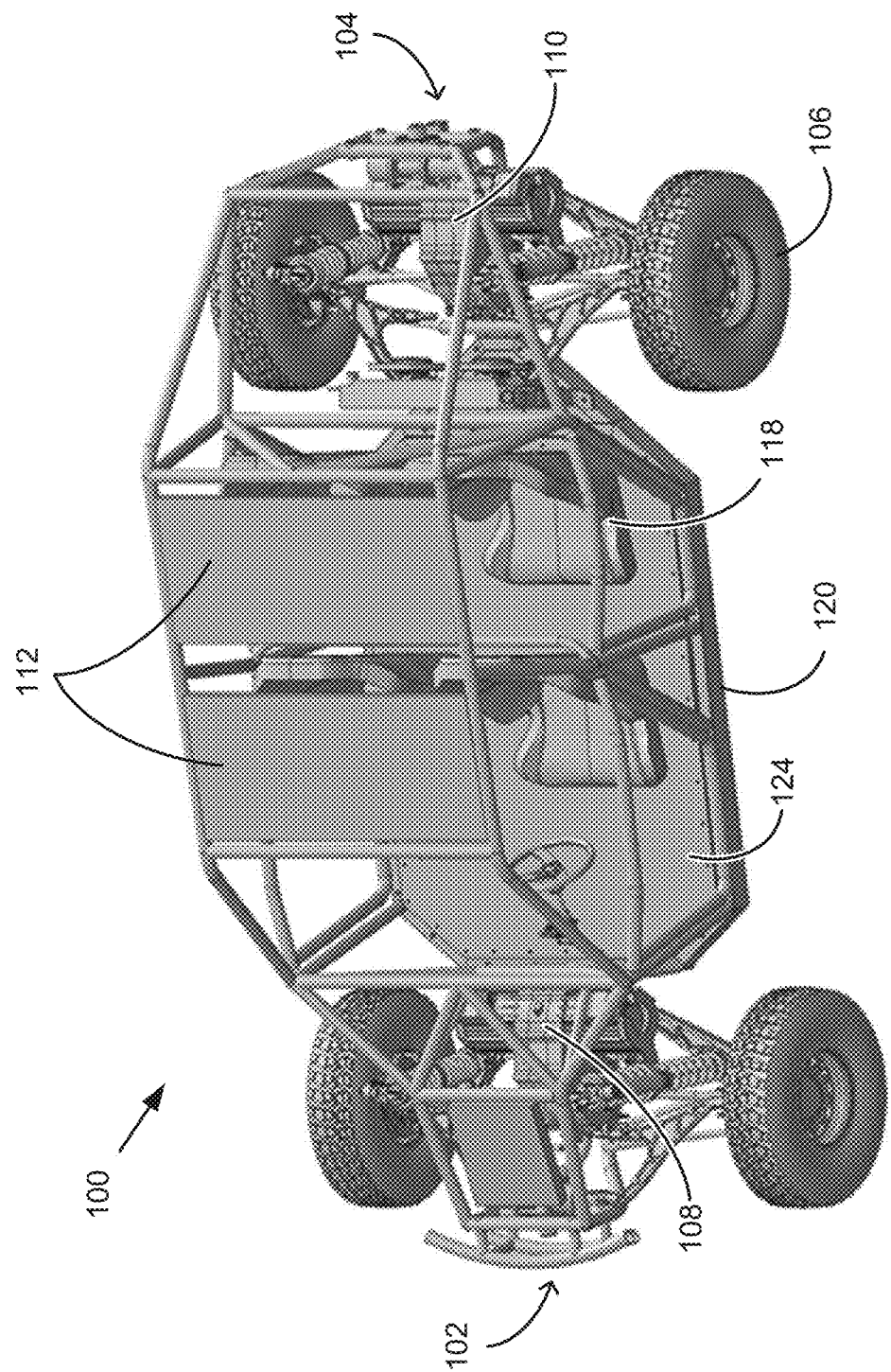
FIG. 6 is a perspective top view of an embodiment of a UTV, side-by-side automobile made in accordance with the teachings and principles of the disclosure.
Figure 7:
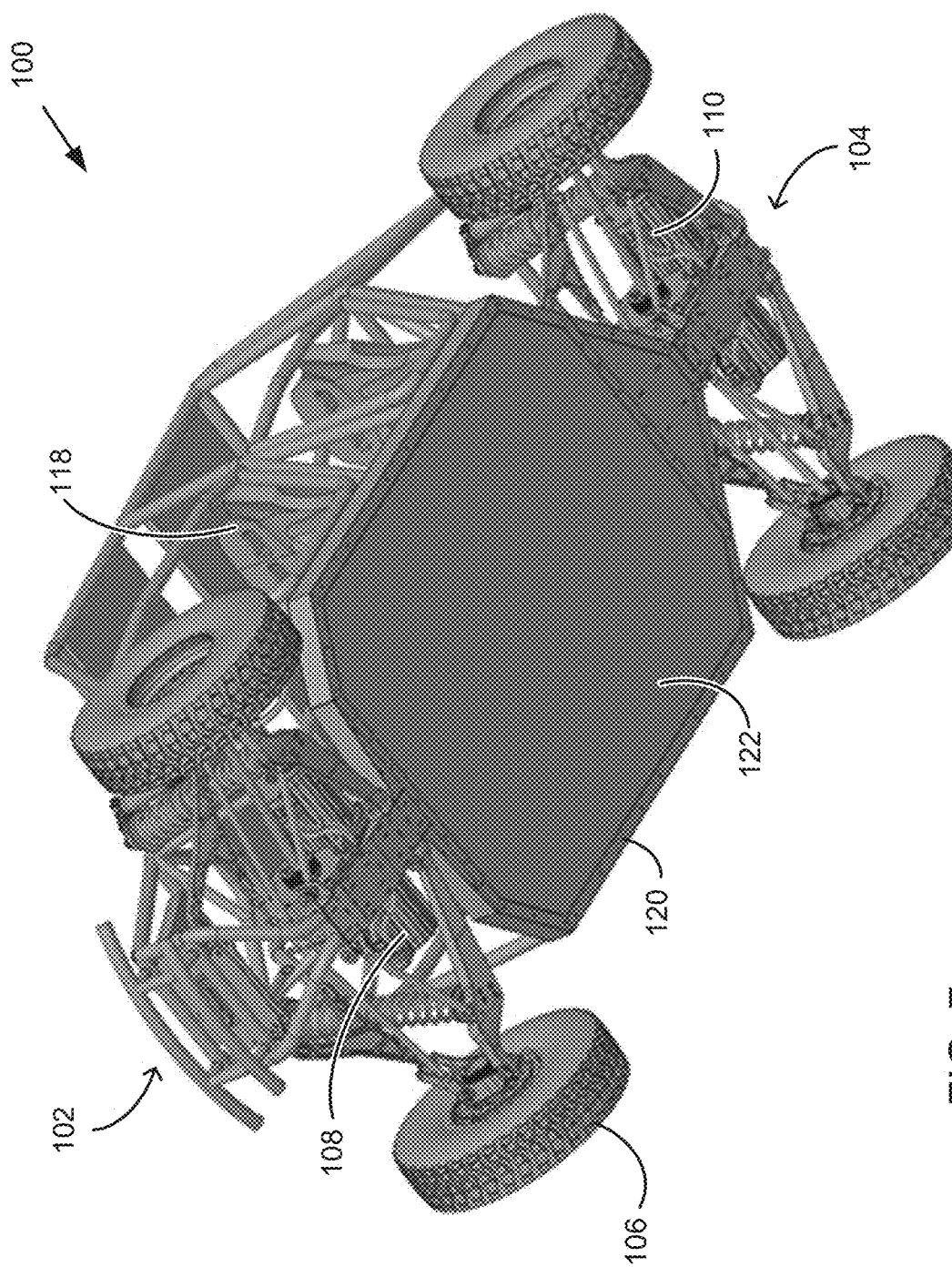
FIG. 7 is a perspective bottom view of an embodiment of a UTV, side-by-side automobile made in accordance with the teachings and principles of the disclosure.

Referring now to the figures, FIGS. 1-7 illustrate one embodiment of a UTV 100 according to the teachings and principles of the disclosure. FIG. 1 illustrates a top view. FIG. 2 illustrates a right/side view. FIG. 3 illustrates a bottom view. FIG. 4 illustrates a rear view. FIG. 5 illustrates a front view. FIG. 6 illustrates a perspective top view and FIG. 7 illustrates a perspective bottom view. FIGS. 1-7 illustrate different views of similar, but not necessarily identical, embodiments.

The UTV 100 includes a front end 102, a back end 104, and a plurality of wheels 106. A front gearbox assembly 108 houses motors and gears for driving the front wheels 106 and a rear gearbox assembly 110 houses motors and gears for driving the rear wheels 106. Roof panels 112 may include a solar array or solar panel for generating electricity from solar light and energy for powering or recharging electrical components of the UTV 100. Front suspension 114 and rear suspension 116 provide suspension and dampening for the vehicle. The front and rear suspension 114, 116 may be much larger than may otherwise be possible due to the compact front and rear gearbox assemblies 108, 110.

A frame 120 may attach and secure other portions of the UTV 100 with respect to each other. A plurality of chairs within a cabin or occupancy area may accommodate a driver and one or more passengers in one or more seats 118 below the roof panels 112 and above a cabin floor 124. A skid plate 122 on an underside of the vehicle 100 and below the cabin may protect a battery assembly or other components underneath the cabin. In one embodiment, a battery assembly (not shown) is positioned between the cabin floor 124 and the skid plate 122.

Figure 8:
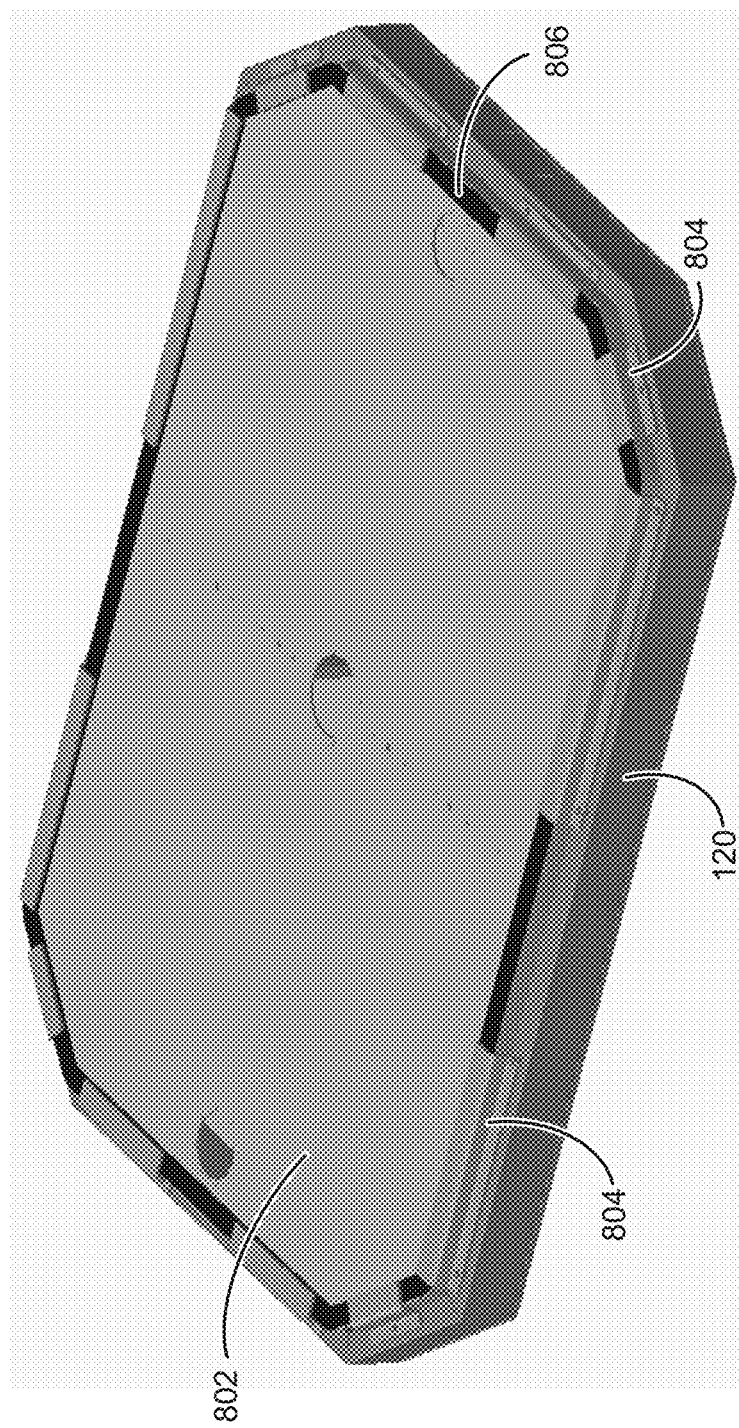
FIG. 8 is a perspective view an embodiment of a skid plate and battery array compartment of a UTV, side-by-side automobile made in accordance with the teachings and principles of the disclosure.

FIG. 8 illustrates a perspective view of a battery assembly 802 attached within a portion of a frame 120. The battery assembly 802 is pancake style having a large length and width, but narrow height. Only a portion of the frame 120 is shown for simplicity in illustration. The battery assembly 802 may serve as a cabin floor 124 or may be located underneath a cabin floor 124. For example, a layer of metal, rubber, carpet, or other material may overlay the battery assembly 802 within the cabin to form the cabin floor 124. The battery assembly 802 is attached to the frame 120 using support brackets 804. The support brackets 804 support the battery assembly 802 with respect to the frame 120 or frame rails. In one embodiment, the support brackets 804 support the battery assembly 802 between rails of the frame 120 so that the battery assembly 802 is located substantially horizontally or latterly neighboring the frame or frame rails.

A rubber isolator 806 is positioned between the support brackets 804 and the battery assembly 802 to reduce the transfer of vibrations between the frame 120 and the battery assembly 802. Other embodiments may include a layer of rubber, or another vibration absorbing material or mechanism, positioned between the battery assembly and the frame to reduce an amount of vibrations present in the frame from being transferred to the battery assembly 802.

Figure 9:
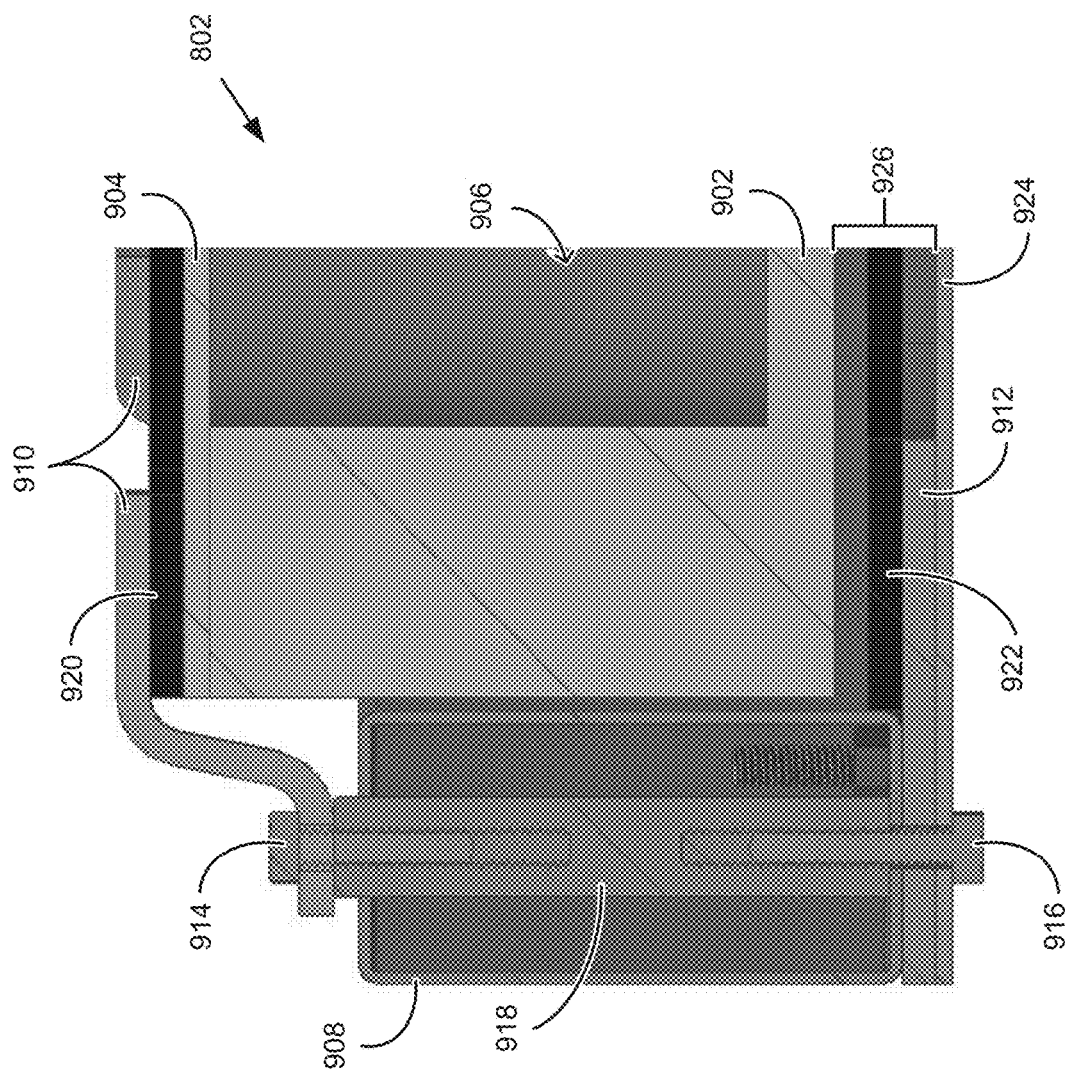
FIG. 9 is a side, partial cross-sectional view of a skid plate and battery array compartment of a UTV, side-by-side automobile made in accordance with the teachings and principles of the disclosure.

FIG. 9 illustrates a cross-sectional side view of a frame rail 908 and a portion of the battery assembly 802. The battery assembly 802 includes a battery box 902 and a battery box lid 904 that form a battery array compartment 906 where a battery array (not shown) may be placed. The battery box 902 and battery box lid 904 are secured to a frame rail 908 using an upper support battery clamp bracket 910, a lower battery support clamp plate 912, and corresponding upper and lower mounting bolts 914, 916. The upper and lower mounting bolts 914, 916 include threads matching threaded holes in a spacer 918 welded within the frame rail 908. As will be understood by one of skill in the art in light of the disclosure, a plurality of frame rails, bolts, and brackets may be used to secure the battery assembly 802 to a frame at various locations.

Isolators, which may include pieces or sheets of rubber, may be positioned between the upper support battery clamp bracket 910 a lower battery support clamp plate 912 and the battery assembly 802 (e.g., the battery box 902 and the battery box lid 904) to dampen vibrations. An upper isolator 920 is shown clamped between the battery box lid 904 and the upper support battery clamp bracket 910. A lower isolator 922 is shown clamped between the battery box 902 and the lower battery support clamp plate 912. Additional isolators may be positioned horizontally between the battery box 902 and the frame rail 908.

A skid plate 924 (see e.g., skid plate 122 of FIGS. 3 and 7) is also secured to the frame. The skid plate 924 is positioned beneath the battery box 902 to protect the battery assembly 802 from impacts from below a UTV 100. For example, rocks, or the ground surface may impact an underside of a UTV 100, risking damage to the battery box 902, internal battery cells, or other parts of the battery assembly 802. With the skid plate 924 secured below the battery assembly 802 damage to the battery assembly 802 may be avoided or reduced. In one embodiment, the skid plate 924 is secured with a gap 926 between the skid plate 924 and the battery box 902. The gap 926 may further limit damage that may occur if impact with an object occurs because the skid plate 924 may flex, stretch, or absorb the damage before any impact with the battery box 902 occurs.

Thus, the battery box 902 is clamped from top and bottom with an isolator on both sides. This will separate the frame torsion modes from the battery assembly 802. This approach will ensure that a battery pack is well secured and isolated. The skid plate 924 could be replaced if required. With the skid plate 924 in place the battery is not the primary strike point for off road events. In one embodiment, isolation and protection of the battery assembly 802 is important for durability and longevity of the battery cells or battery array of the battery assembly 802. For example, reducing vibration or impact may reduce the chance that a battery cell is damaged or that electrical connections within the battery assembly 802 are broken.

Figure 10:
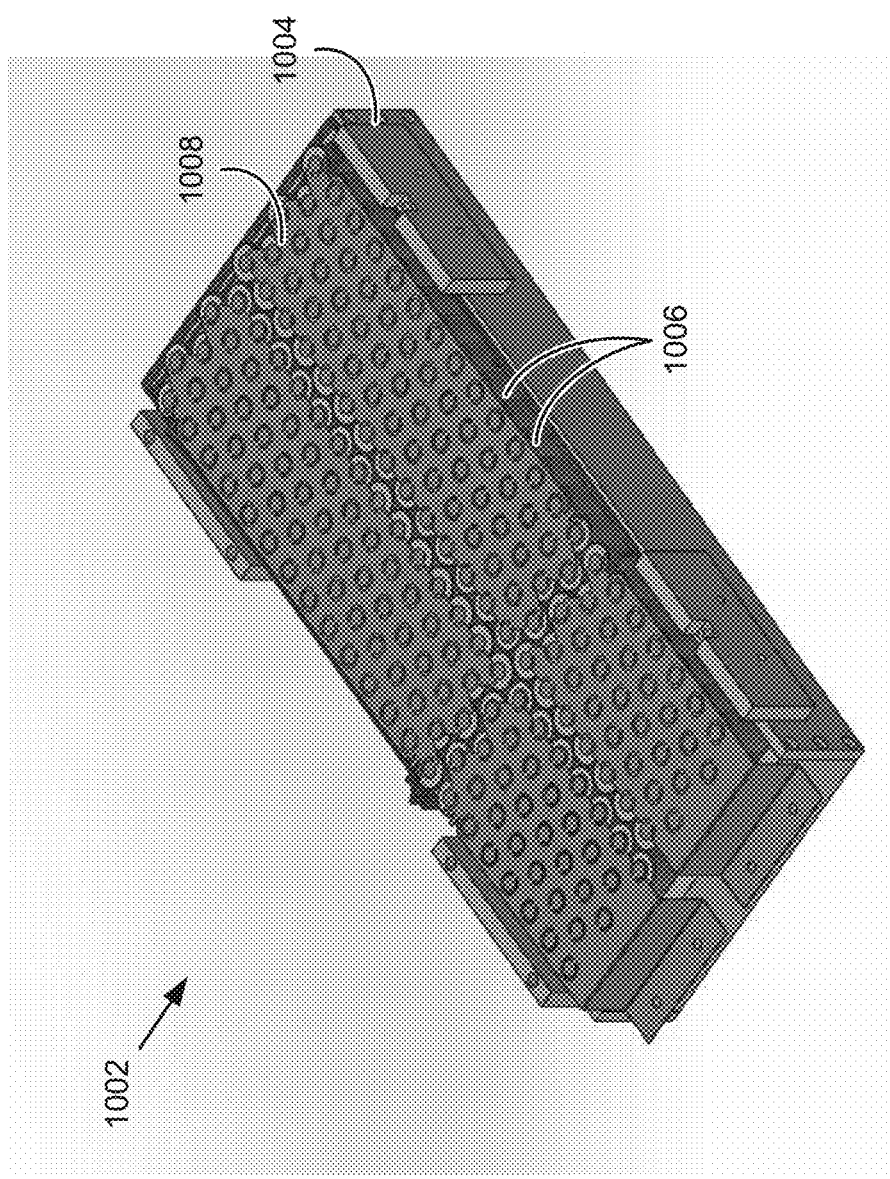
FIG. 10 is a perspective view of a battery array unit illustrating a bus bar in accordance with the teachings and principles of the disclosure.

FIG. 10 illustrates a perspective view of a battery array unit 1002, according to one embodiment. One or more battery array units 1002 may be positioned and/or interconnected within a battery array compartment (see e.g., the battery array compartment 906 of FIG. 9). The battery array unit 1002 includes a separator 1004 for holding a plurality of battery cells 1006. The battery cells 1006 may include cylindrical battery cells. The battery cells 1006 may include 1.5 volt or other battery cells. The battery array unit 1002 also includes one or more bus bar sheets 1008 for electrically connecting to the battery cells 1006.

Figure 11:
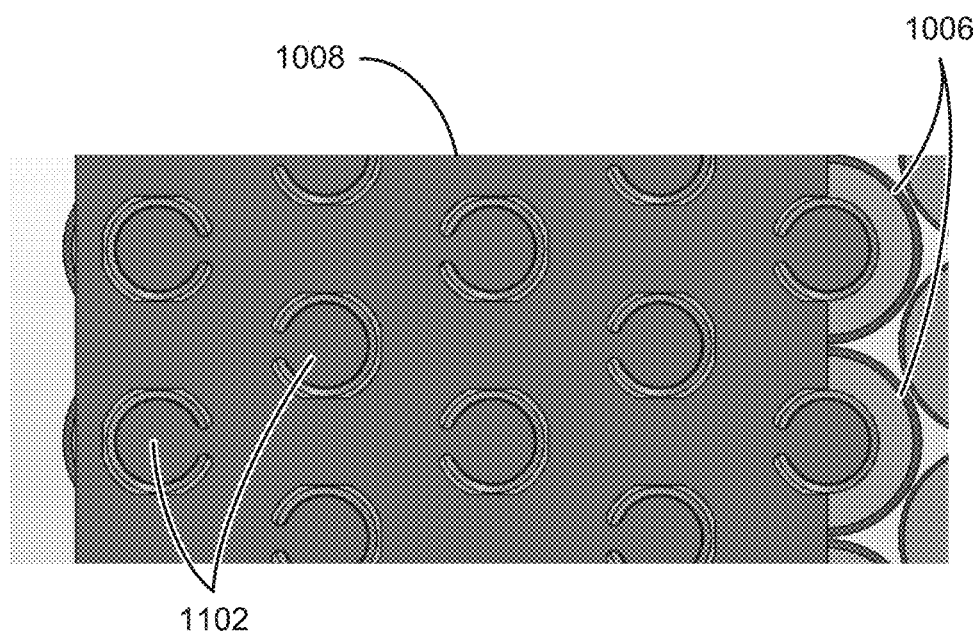
FIG. 11 is a close-up plan view of a bus bar in accordance with the teachings and principles of the disclosure.

FIG. 11 illustrates a close up view of a portion of a bus bar sheet 1008 and battery cells 1006. The bus bar sheet 1008 includes a sheet of metal, such as copper, with cut out portions 1102 that correspond to electrodes or terminals of the battery cells 1006. The bus bar sheet 1008 may be created by stamping out sections of the sheet surrounding cut-out portions 1102. The cut-out portions 1102 remain electrically attached to the bus bar sheet 1108, but are sufficiently thermally isolated so that they can be welded or soldered to terminals or electrodes of the battery cells 1006. The plurality of cut-out portions 1008 is arranged in a two dimensional manner to allow a single bus bar sheet 1008 to contact and/or be welded to a plurality of battery cells 1006.

In addition to providing electrical contact and connection to the battery cells 1006, the bus bar sheet 1008 also provides structural support to hold the battery cells 1006 in place even in the presence of vibrations or jostling of a battery assembly. For example, each welded/soldered cut out portion is supported by the bus bar sheet 1008 and thus provides lateral (from the perspective of FIG. 11) support to limit movement of the battery cells 1006. The bus bar sheet 1008 also provides uniform and efficient cooling of the battery cells 1006.

The bus bar sheet 1008 also provides high quality electrical contacts to the battery cells 1006 with minimal wiring or interconnects. For example, a single bus bar sheet 1008 may be used to connect to a large number of battery cells 1006. For example, FIG. 10 illustrates a single bus bar sheet 1008 connected to 70 battery cells 1006. Some embodiments may include bus bar sheets 1008 that connect to a hundred, multiple hundreds, or more battery cells. Bus bar sheets 1008 may also be positioned on both sides of the battery cells 1006 to connect a plurality of positive or negative terminals on each side. Due to the large number of electrical connections that can be formed, a reduction in wiring and associated labor and time may be achieved. Additionally, the bus bar sheets 1008 perform well at drawing heat from the batteries to cool.

Figure 12:
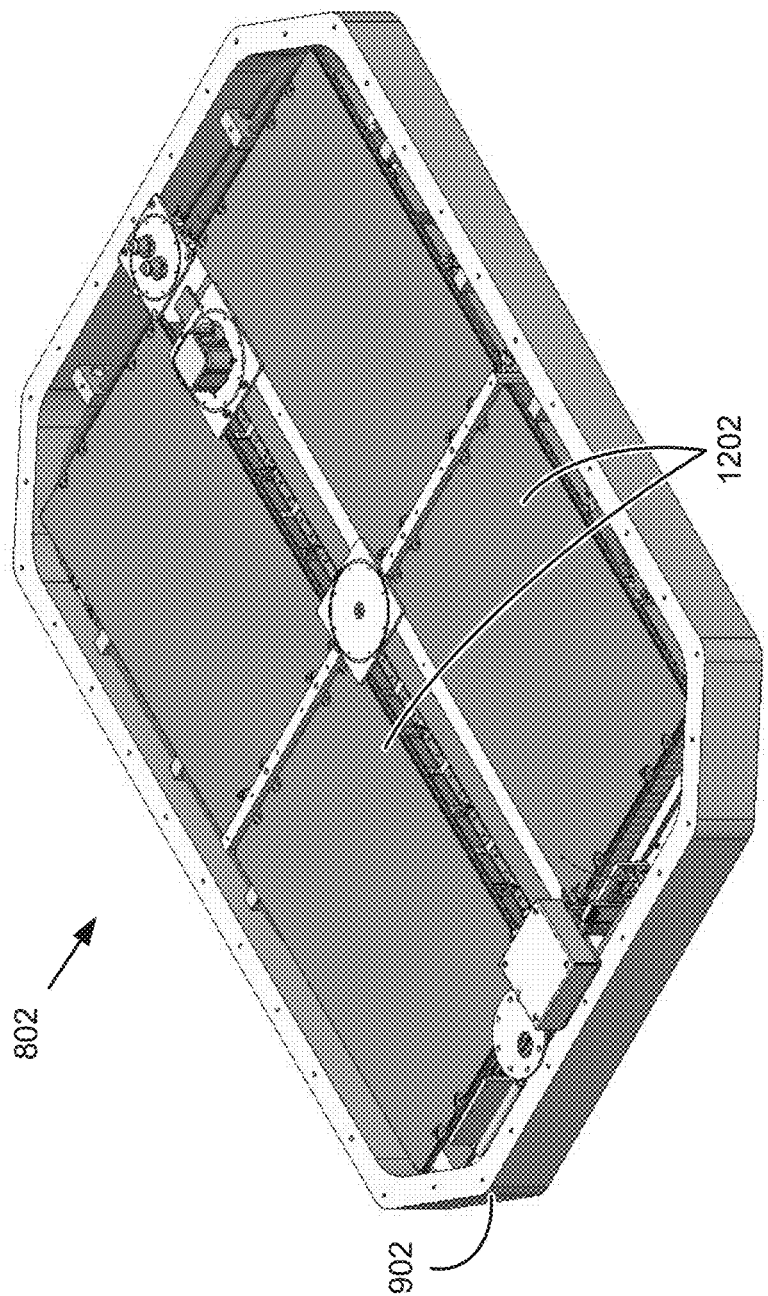
FIG. 12 a perspective view of a battery assembly with a battery box lid removed in accordance with the teachings and principles of the disclosure.

FIG. 12 is a perspective view of a battery assembly 802 with a battery box lid 904 removed. A plurality of battery array units 1002 (see e.g., FIG. 9) are positioned within the battery box 902. Cooling plates 1202 are positioned above and below the battery array units 1002. Because heat generation in battery cells occurs nearer to the flat ends (terminal locations) of the batteries than along the rounded sides, Applicant has found that it is more effective to cool battery arrays using cooling plates 1202 positioned at the ends of the batteries and perpendicular to an axis of the batteries. In FIG. 12, for example, battery cells are positioned vertically such their access is oriented vertically, but the cooling plates 1202 are positioned horizontally, or perpendicularly to the axis of the battery cells. Thus, the cooling plates 1202 are able to effectively draw heat from the ends of the battery cells to efficiently cool the battery array. In one embodiment, the cooling plates 1202 are made of conductive metal positioned at ends near the terminals. As such, a thermally conductive electric insulator (such as Gap Pad® available from Henkel®) may be used between the cooling plates 1202 and an underlying bus bar sheet 1008 to allow heat transfer, but prevent the flow of electricity from the battery cells to the cooling plates 1202.

Figure 13:
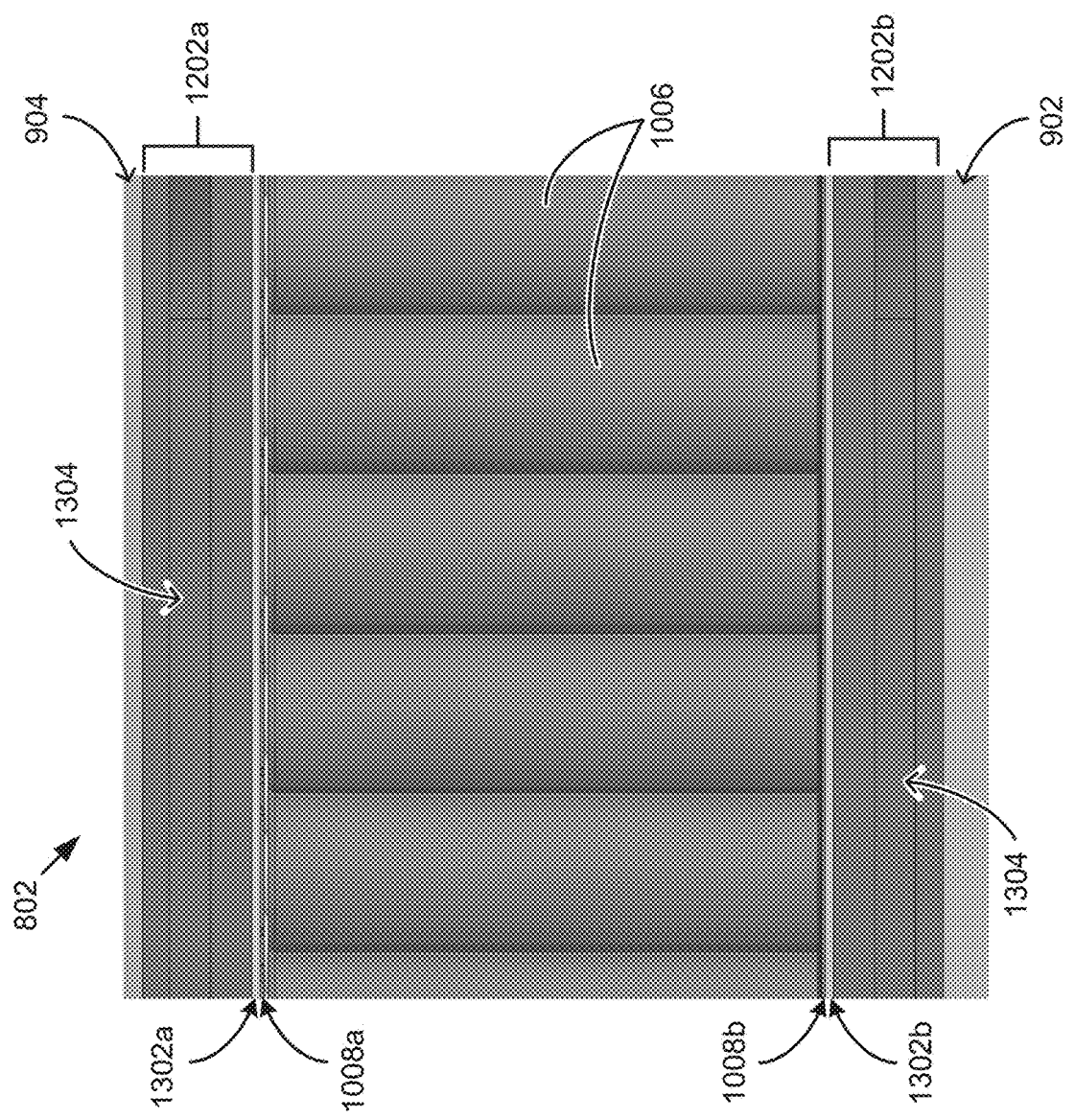
FIG. 13 is a cross-sectional side view of a portion of the battery assembly in accordance with the teachings and principles of the disclosure.

FIG. 13 is a cross-sectional side view of a portion of the battery assembly 802, according to one embodiment. Starting from the top, the battery assembly includes a box lid 904, an upper cooling plate 1202a, an upper layer of thermal filler material 1302a (such as a gel or sheet of thermally conductive, but electrically non-conducting material), an upper bus bar sheet 1008a welded to the battery cells 1006, battery cells 1006, a lower bus bar sheet 1008b welded to the battery cells 1006 a lower layer of thermal filler material 1302b, a lower cooling plate 1202b, and the battery box 902. The upper and lower cooling plates 1202a, 1202b include cooling tubes 1304 or cavities through which a liquid or gas such as a water glycol mixture or a refrigerant may be pumped to maintain the cells within a desired temperature range. The improved cooling provided by the bus bar sheets 1008, cooling plates 1202, and the illustrated orientation can improve the life and performance of the battery cells 1006.

Figure 14:
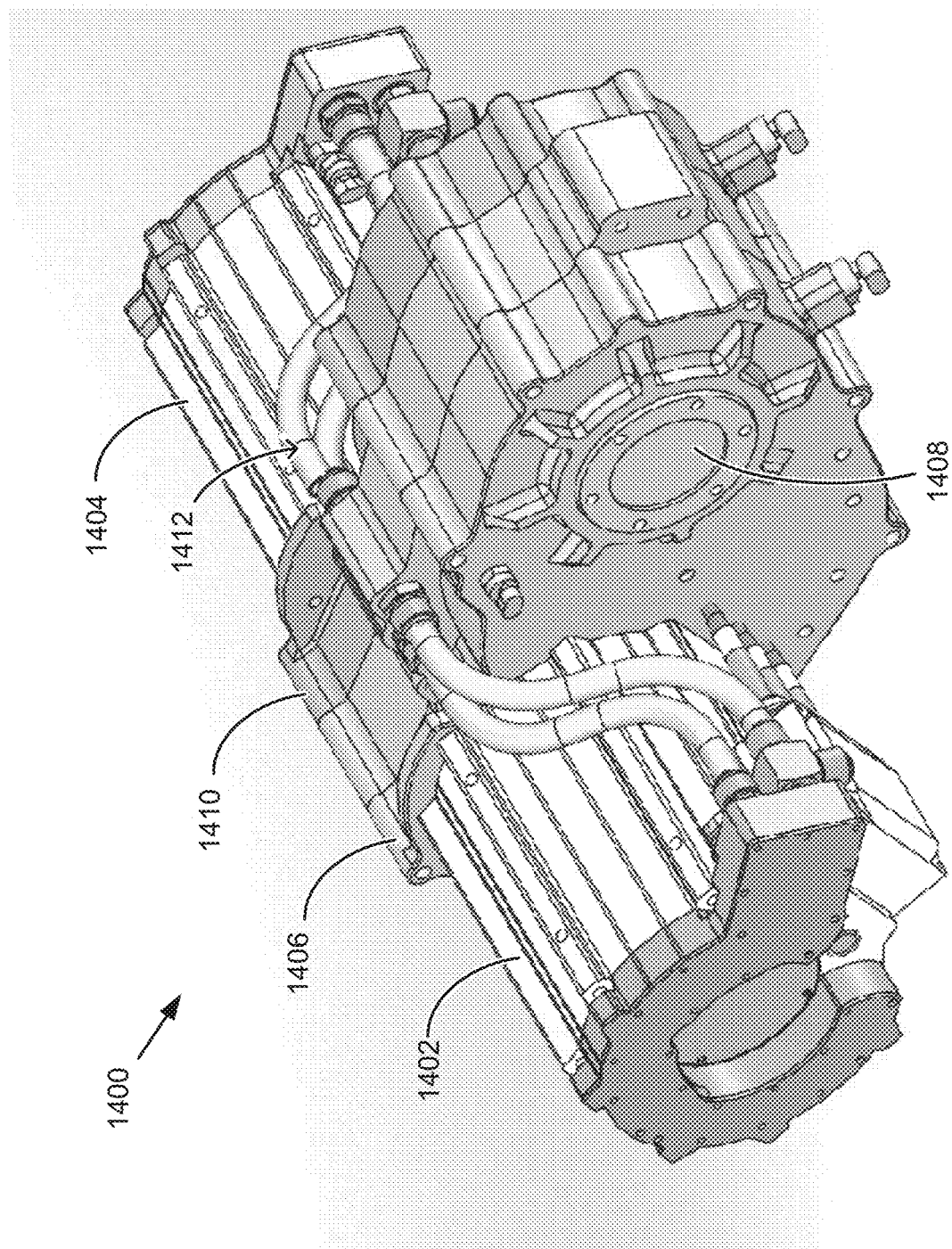
FIG. 14 is a perspective view of a motor gearbox assembly in accordance with the teachings and principles of the disclosure.
Figure 15:
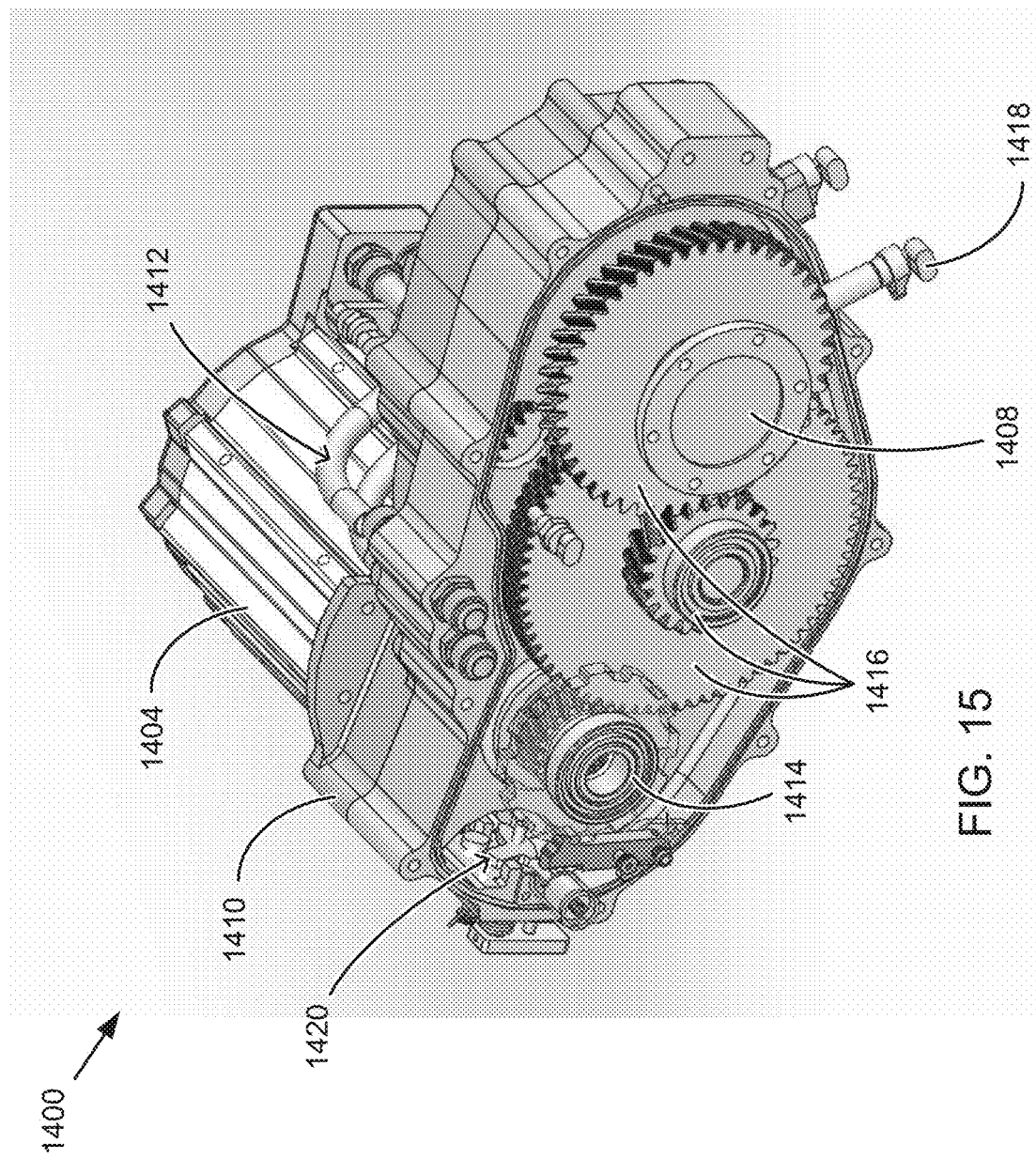
FIG. 15 is a perspective view of a motor gearbox assembly showing internal gears in accordance with the teachings and principles of the disclosure.

FIGS. 14 and 15 illustrate components of a motor gearbox assembly 1400, according to one embodiment. FIG. 14 is a perspective view of a motor gearbox assembly 1400. The motor gearbox assembly 1400 may include a first motor 1402, a second motor 1404, a first motor gearbox 1406 with first output 1408, and a second motor gearbox 1410 with second output (not visible) all housed within a common housing. First and second motors 1402, 1404, and first and second motor gearboxes 1406, 1410 are rigidly coupled to form a single rigid motor gearbox assembly 1400. The combination of these components into a common housing or device increases simplicity and compactness. Furthermore, a cooling system including cooling tubes 1412 is shared by the whole motor gearbox assembly 1400. A common cooling system further reduces complexity and increases efficiency.

FIG. 15 is a perspective view of the motor gearbox assembly 1400 with the first motor 1402 removed. A motor input 1414 for the first motor 1402 is shown with speed reducing gears 1416 to provide torque to the first output 1408. Each motor and associated gears provide independent power to each wheel, even though they are combined into one housing. A rotation sensor 1418 is used to determine rotation speed at the first output 1408. A parking lock mechanism 1420 may lock the gearbox to limit rotation of the first output 1408. The high torque output of the electric motor gearbox allows larger stock wheels to be used than conventional UTVs. In an embodiment, 32 inch stock wheels may be used on the UTV because of the high torque output of the electric motor gearbox.

Figure 16:
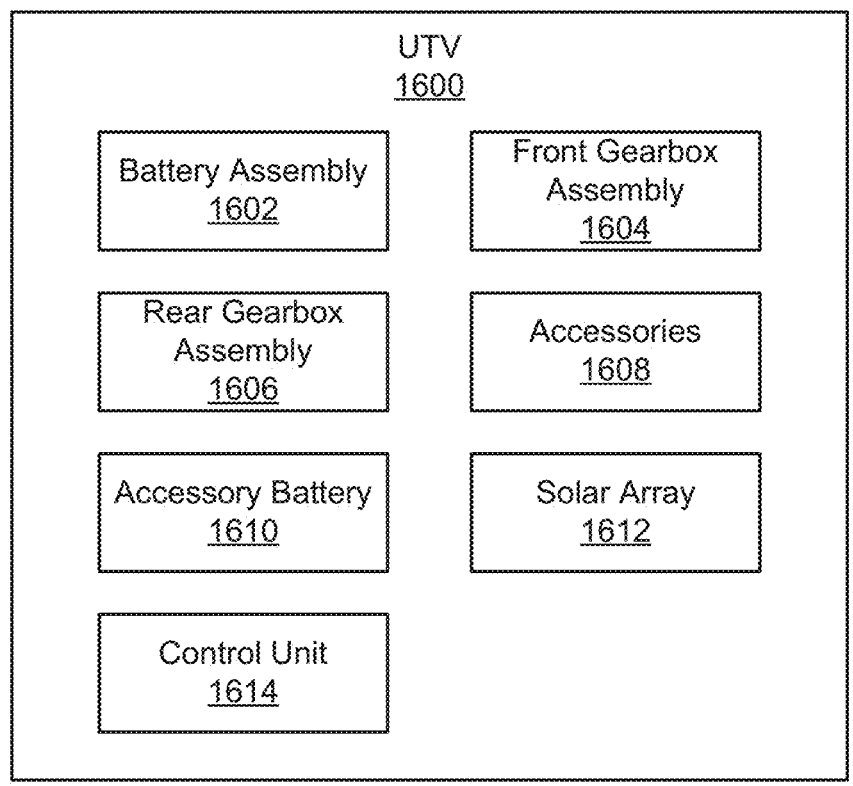
FIG. 16 is a schematic block diagram illustrating example components of a UTV in accordance with the teachings and principles of the disclosure.

FIG. 16 is a schematic block diagram illustrating example components of a UTV 1600. The UTV 1600 includes a battery assembly 1602, a front gearbox assembly 1604, a rear gearbox assembly 1606, accessories 1608, an accessory battery 1610, a solar array 1612, and a control unit 1614. The components 1602-1614 are given by way of example only and may not all be included in all embodiments.

The battery assembly 1602 includes a battery array for storing/providing electricity for driving one or more motors of a vehicle. For example, the battery assembly 1602 may include the battery assembly 802 or other battery features or components disclosed and described in relation to FIGS. 1-13.

The front gearbox assembly 1604 includes one or more motors and gears for driving one or more front wheels. The rear gearbox assembly 1606 includes one or more motors and gears for driving one or more rear wheels. In one embodiment, the front gearbox assembly 1604 and/or the rear gearbox assembly 1606 includes a gearbox as disclosed and described in relation to FIGS. 1-7 and 14-15. For example, the front gearbox assembly 1604 and/or the rear gearbox assembly 1606 may each include two motors with independent outputs to control respective front or rear motors to provide the ability for four wheel drive.

The accessories 1608 may include electronic devices or systems to assist during the driving, operation, or use of the UTV 1600. For example, the accessories 1608 may include an instrument panel, a winch, an external light, a cabin light, an accessory power outlet, a display screen, a camera, a radio transceiver for wireless voice or data communication, or the like.

The accessory battery 1610 may include a 12 volt battery, such as a lead acid or other battery, for powering the accessories 1608. The accessory battery 1610 may provide electrical power to accessories to limit usage of power from the battery cells of the battery assembly 1602. For example, the battery assembly 1602 may be used for the motors or drive train while the accessory battery 1610 is used for accessories 1608.

The solar array 1612 includes one or more solar panels for generating electricity to power the accessories 1608, recharging the accessory battery 1610, and/or recharging the cells of the battery assembly 1602. The solar array 1612 may include solar panels mounted on a roof of the UTV 1600, such as above a cabin area of the UTV 1600. The solar array may include two 300 watt solar panels on the roof to power the accessories or recharge a battery.

The control unit 1614 is configured to control operation of the UTV 1600. In one embodiment, the control unit 1614 controls a drive train and motors to drive the vehicle. The control unit 1614 may include a drive by wire system that receives input from an accelerator pedal, a brake pedal, a steering wheel, drive train sensors (such as current wheel/motor speeds, etc.), or the like. Based on the input, the control unit 1614 can control movement or driving of the vehicle to match the user's input and/or current conditions of the UTV 1600. In one embodiment, the control unit 1614 provides independent and dynamic control of each motor/wheel to provide "torque vectoring" to improve turning, tire wear, or the like.

The control unit 1614 may also provide power management for the battery assembly 1602 and/or the accessory battery 1610. For example, the control unit 1614 may turn off or disable different features based on a power level of the battery assembly 1602. If the charge level is low, the control unit 1614 may disable certain accessories, or modify driving characteristics to most efficiently use remaining battery power.

In one embodiment, the control unit 1614 may receive over-the air updates via a radio transceiver. The control unit 1614 may also enforce driving profiles based on a key, RFID tag, or the like, of the current driver.

Figure 17:
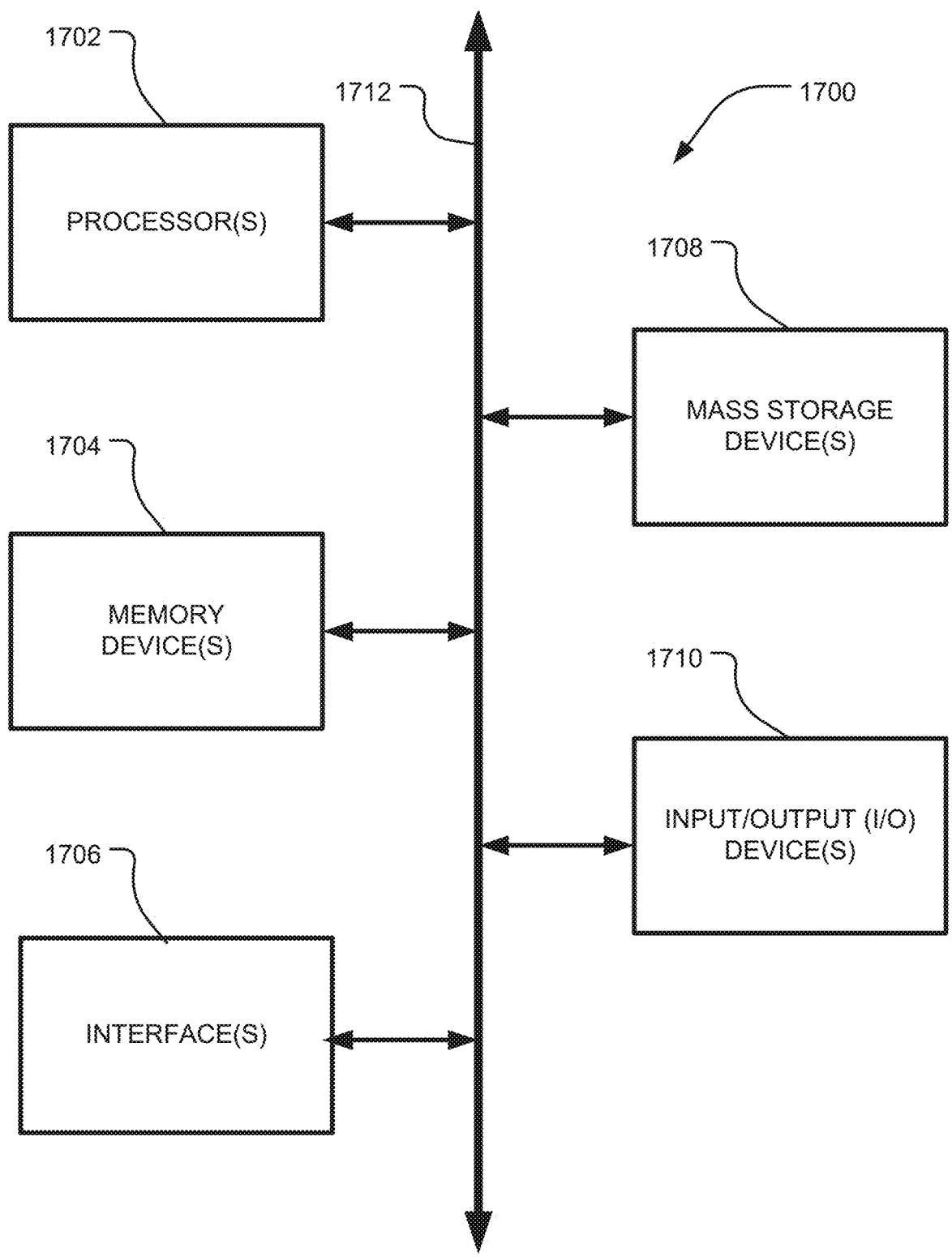
FIG. 17 is a block diagram depicting an example computing device.

FIG. 17 is a block diagram depicting an example computing device 1700. In some embodiments, computing device 1700 is used to implement one or more of the systems and components discussed herein, such as the control unit 1614 of FIG. 16. Further, computing device 1700 may interact with any of the systems and components described herein. Accordingly, computing device 1700 may be used to perform various procedures and tasks, such as those discussed herein. Computing device 1700 can function as a server, a client or any other computing entity. Computing device 1700 can be any of a wide variety of computing devices, such as a desktop computer, a notebook computer, a server computer, a handheld computer, a tablet, and the like.

Computing device 1700 includes one or more processor(s) 1702, one or more memory device(s) 1704, one or more interface(s) 1706, one or more mass storage device(s) 1708, and one or more Input/Output (I/O) device(s) 1710, all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM)) and/or nonvolatile memory (e.g., read-only memory (ROM)). Memory device(s) 1704 may also include rewritable ROM, such as Flash memory.

Mass storage device(s) 1708 include various computer readable media, such as magnetic tapes, magnetic disks, optical disks, solid state memory (e.g., Flash memory), and so forth. Various drives may also be included in mass storage device(s) 1708 to enable reading from and/or writing to the various computer readable media. Mass storage device(s) 1708 include removable media and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, lenses, CCDs or other image capture devices, and the like.

Interface(s) 1706 include various interfaces that allow computing device 1700 to interact with other systems, devices, or computing environments. Example interface(s) 1706 include any number of different network interfaces, such as interfaces to local area networks (LANs), wide area networks (WANs), wireless networks, and the Internet.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 1712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1700, and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended convey the implementation apparatus for accomplishing a process, such as by hardware, or a combination of hardware, software, and/or firmware, for the purposes of performing all or parts of query operations.

Specifications of One Embodiment

In one embodiment, the UTV is 100% electrically powered. The UTV includes four passenger side by side seats. The UTV includes a 50 kilo-watt hour (kWhr) battery with electric motors to provide over 620 HP, 480 ft. lbs. of torque, 20 inches of suspension travel on all 4 wheels, and 100 to 150 miles of range per charge. The components are air tight with the ability to be submerged. The UTV includes a single 155 Horsepower electric motor for each wheel (4×4) and produces 0-60 acceleration times around three seconds. Most of the UTV's components sit at or below the frame rail, thereby lowering the center of gravity and improving anti-roll over capabilities exceed that of most other UTV's. Low center of gravity was accomplished by removing the gasoline engine, clutch and emission equipment. Benefits of removing the gasoline drive train include: increased suspension travel, better handling, reduction in greenhouse gas emissions, quieter ride and no belts or clutches to fail.

The UTV's electric motors are powered by a liquid-cooled, 400-volt, 50 kWh lithium-ion battery pack (over 4,000 lithium cells). The four independent electric motors absorb the braking energy and deliver it back to the batteries, cutting the braking distance (in half by some estimates) while increasing range and safety. The UTV can be charged with either an 110V outlet, J1772 standard electric vehicle fast charger, or a custom 400V custom generator for rapid charging. The UTV includes two 300 watt solar panels on the roof to keep a 360-amp hour 12-volt lithium accessory battery bank topped off, reducing the need to pull energy from the larger 400-volt pack to run the 12-volt components. The large 12-volt bank supplies power to the front and rear LED light bars, flood lights, ambient lights, dual 3,500 lb winches, touch screen displays, and 110-volt and 12-volt outlets.

The UTV includes a drive-by-wire rear steering system that allows up to 10 degrees of rear steer at low speeds, up to 5 degrees of steer under 20 MPH and locks into straight position over 20 MPH. Rear steering provides up to a 50% improvement over previous UTV turning radiuses. With the touch of a button, or screen, a user can disable rear steer or switch to 2-wheel drive on the fly at any speed.

The UTV includes 4G LTE connectivity. This allows owners to not only control who drives the UTV, but also how the UTV is driven. With an app, a user inputs each person's profile into the system and creates parameters to control speed and travel distance; especially beneficial for younger and newer riders. The app will also send alerts when the UTV needs service or an over-the-air software update.

Because there is an electric motor at each wheel, the UTV's control unit provides dynamic control of each wheel. This is called "torque vectoring" and it is accomplished by controlling the speed and torque of each of the four wheels independent of each other at any given moment. This torque vectoring hardware and software system allows for faster cornering, quicker stops, improved traction and tire wear and longer component life over any other UTV. Torque vectoring technology is not available with a conventional drive train powered by a gasoline engine.

The UTV includes two 7" displays that show a variety of information, including: user profile, battery levels and remaining travel distance, tire pressure, terrain profiles and much more. The UTV includes on board air compressor and tire inflation system that allows the driver to quickly choose a terrain setting—sand, road, rock crawl, dirt or automatic—and a controller will instruct the compressor to automatically adjust the tire pressure to the terrain. With bead lock rims, a user can rest assured the tire will not come off the rim even at the lowest terrain settings.

Examples

Example 1 is a UTV that includes a frame having frame rails and a battery assembly positioned laterally between the frame rails. The battery assembly includes a battery housing and a battery array having a plurality of battery cells. The battery array is positioned within the battery housing and the battery assembly provides support for or is located under a floor of a cabin of the utility task vehicle.

In Example 2, the frame rails in Example 1 include a first frame rail positioned proximal a first side of the floor of the cabin and a second frame rail positioned proximal a second side of the floor of the cabin. The battery housing includes a battery box and a battery lid that extend from approximately the first frame rail to the second frame rail. The battery box is sized to leave room for an air gap or vibration isolator material positioned between the battery box and the first frame rail and the second frame rail.

In Example 3, the UTV as in any of Examples 1-2 further includes one or more battery support brackets extending between the frame rails and the battery assembly, wherein the one or more battery support brackets support the battery assembly with respect to the frame rails.

In Example 4, the UTV as in any of Examples 1-3 further includes an isolator positioned between the battery assembly and the frame to reduce transfer of vibrations between the frame and the battery assembly.

In Example 5, the UTV as in any of Examples 1-4 further includes one or more securing members configured to secure the battery assembly. The one or more securing members may be released to allow the battery assembly to be removed from the UTV in a downward direction.

In Example 6, the UTV as in any of Examples 1-5 further includes a skid plate positioned below the battery assembly to protect the battery assembly from impact or abrasion.

In Example 7, the skid plate as in Example 6 is positioned with a gap between the battery assembly and the skid plate.

In Example 8, the gap as in Example 7 includes one or more of an air gap and a layer of rubber to absorb impact or vibrations.

In Example 9, the UTV as in any of Examples 1-8 further includes an accessory battery for powering one or more accessories, wherein the battery assembly is used for powering one or motors for driving wheels of the UTV and the accessory assembly is used for powering the one or more accessories comprising one or more of: an instrument panel, a winch, an external light, a cabin light, an accessory power outlet, a display screen, or a camera.

In Example 10, the UTV as in any of Examples 1-9 further includes one or more solar panels. The solar panels may be used to recharge the accessory battery or provide power to the one or more accessories.

In Example 11, the battery cells as in any of Examples 1-10 include one or more contacts for electrical output at a first surface, wherein the battery assembly further comprises a cooling plate substantially parallel to the first surface.

In Example 12, the battery cells as in any of Examples 1-11 includes cylindrical cells. The battery assembly further includes one or more cooling plates located at an end of one or more of the cylindrical cells, wherein the one or more cooling plates are perpendicular to an axis of the cylindrical cells.

In Example 13, the battery assembly as in any of Examples 1-12 further includes a bus bar electrically connecting a plurality of battery cells, wherein the bus bar is a conductive sheet with a plurality of cut-out portions each corresponding to an electrode of a battery cell.

In Example 14, a specific cut-out portion as in Example 13 is welded to an electrode of a corresponding battery cell.

In Example 15, the plurality of cut-out portions as in any of Examples 13-14 includes a grid of cut-out portions on the bus bar extending in a first direction and in a second direction substantially orthogonal to the first direction.

In Example 16, the UTV as in any of Examples 1-15 further includes a housing, a first motor, a second motor, a first gearbox configured to receive input from the first motor and provide output to a first output corresponding to a first wheel, and a second gearbox configured to receive input from the second motor and provide output to a second output corresponding to a second wheel. The first motor, second motor, first gearbox, and second gearbox are housed within the housing.

Example 17 is a UTV that includes a motor gearbox assembly. The motor gearbox assembly includes: a housing; a first motor; a second motor; a first gearbox configured to receive input from the first motor and provide output to a first output corresponding to a first wheel; and a second gearbox configured to receive input from the second motor and provide output to a second output corresponding to a second wheel. The first motor, second motor, first gearbox, and second gearbox are housed within the housing.

In Example 18, the UTV of Example 17 further includes a cooling system configured to cool the first motor, second motor, first gearbox, and second gearbox on a common loop.

In Example 19, the UTV as in any of Examples 17-18 further includes a controller configured to control rotation of the first motor and the second motor.

In Example 20, the first motor and first output as in any of Examples 1-19 are independently controlled from the second motor and the second output.

In Example 21, the motor gearbox assembly as in any of Examples 17-19 includes a first motor gearbox assembly and the housing comprises a first housing. The UTV further comprises a second motor gearbox assembly, wherein the second motor gearbox assembly comprises a second housing, a third motor, a fourth motor, a third gearbox, and a fourth gearbox.

In Example 22, the UTV as in any of Examples 17-21 further includes an accessory battery for powering one or more accessories and a drive battery. The drive battery is used for powering one or motors for driving wheels of the UTV and the accessory assembly is used for powering the one or more accessories including one or more of: an instrument panel, a winch, an external light, a cabin light, an accessory power outlet, a display screen, or a camera.

In Example 23, the UTV as in any of Examples 17-22 further includes one or more solar panels configured to recharge the accessory battery or provide power to the one or more accessories.

Example 24 is a battery assembly. The battery assembly includes a battery housing comprising a battery box and a battery lid forming a battery compartment. The battery assembly includes a battery array having a plurality of cylindrical battery cells positioned within the battery compartment. The battery assembly includes a bus bar electrically connecting a plurality of the battery cells. The bus bar includes a conductive sheet with a plurality of cut-out portions each corresponding to an electrode of a battery cell. The battery assembly includes one or more cooling plates located at an end of one or more of the cylindrical cells, wherein the one or more cooling plates are perpendicular to an axis of the cylindrical cells.

In Example 25, each of the battery cells as in Example 24 includes one or more contacts for electrical output at a first surface, wherein the cooling plate is substantially parallel to the first surface.

In Example 26, a specific cut-out portion as in any of Examples 24-25 is welded to an electrode of a corresponding battery cell.

In Example 27, the battery assembly as in any of Examples 24-26 further includes a coolant pump and a fluid coolant comprising one or more of water and a refrigerant. The coolant pump pumps the fluid coolant through the cooling plates to maintain a temperature of the battery assembly within a defined temperature range.

Example 28 is an apparatus including means to realize a system or apparatus as in of any of Examples 1-27.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. An electrically-powered UTV comprising:
   a frame comprising frame rails;
   a battery assembly comprising a battery housing and a plurality of battery cells, wherein the battery housing is positioned between the frame rails and secured to the frame rails by an upper support battery clamp bracket and a lower battery support clamp plate, and wherein the lower battery support clamp plate is positioned beneath a bottom surface of the battery housing;
   a motor gearbox housing;
   a first motor;
   a second motor;
   a first gearbox configured to receive input from the first motor and provide output to a first output corresponding to a first wheel; and
   a second gearbox configured to receive input from the second motor and provide output to a second output corresponding to a second wheel,
      wherein the first motor, second motor, first gearbox, and second gearbox are housed within the motor gearbox housing.

2. The UTV of claim 1, wherein the first motor and the second motor are electric motors.

3. The UTV of claim 1, further comprising a cooling system configured to cool the first motor, second motor, first gearbox, and second gearbox on a common loop.

4. The UTV of claim 1, further comprising a controller configured to control rotation of the first motor and the second motor.

5. The UTV of claim 1, wherein the first motor and the first output are independently controlled from the second motor and the second output.

6. The UTV of claim 1, further comprising an accessory battery for powering one or more accessories and a drive battery, wherein the drive battery is used for powering one or motors for driving wheels of the UTV and the accessory assembly is used for powering the one or more accessories comprising one or more of: an instrument panel, a winch, an external light, a cabin light, an accessory power outlet, a display screen, or a camera.

7. The UTV of claim 6, further comprising one or more solar panels.

8. The UTV of claim 7, wherein the one or more solar panels is configured to recharge the accessory battery.

9. The UTV of claim 7, wherein the one or more solar panels is configured to provide power to the one or more accessories.

10. An electrically-powered UTV comprising:
    a frame comprising frame rails;
    a first gearbox assembly comprising a first motor gearbox housing, a first electric motor, a second electric motor, a first gearbox configured to receive input from the first electric motor and provide output to a first output corresponding to a first wheel, and a second gearbox configured to receive input from the second electric motor and provide output to a second output corresponding to a second wheel,
       wherein the first electric motor, second electric motor, first gearbox, and second gearbox are housed within the first motor gearbox housing;
    a second gearbox assembly comprising a second motor gearbox housing, a third electric motor, a fourth electric motor, a third gearbox configured to receive input from the third electric motor and provide output to a third output corresponding to a third wheel, and a fourth gearbox configured to receive input from the fourth electric motor and provide output to a fourth output corresponding to a fourth wheel,
    wherein the third electric motor, fourth electric motor, third gearbox, and fourth gearbox are housed within the second motor gearbox housing; and
    a battery assembly electrically coupled to and configured to provide power to each of the first electric motor, second electric motor, third electric motor, and fourth electric motor,
    wherein the battery assembly comprises a battery housing and a plurality of battery cells, wherein the battery housing is positioned between the frame rails and secured to the frame rails by an upper support battery clamp bracket and a lower battery support clamp plate, and wherein a portion of the battery housing is positioned above a top surface of at least one of the frame rails.

11. The UTV of claim 10, further comprising a first cooling system configured to cool the first electric motor, second electric motor, first gearbox, and second gearbox on a common first loop.

12. The UTV of claim 10, further comprising a controller configured to control rotation of the first electric motor and the second electric motor.

13. The UTV of claim 12, wherein the controller is configured to control rotation of the third electric motor and the fourth electric motor.

14. The UTV of claim 10, wherein the first electric motor and the first output are independently controlled from second electric motor and the second output.

15. The UTV of claim 10, further comprising an accessory battery for powering one or more accessories and a drive battery, wherein the drive battery is used for powering one or motors for driving wheels of the UTV and the accessory assembly is used for powering the one or more accessories comprising one or more of: an instrument panel, a winch, an external light, a cabin light, an accessory power outlet, a display screen, or a camera.

16. The UTV of claim 15, further comprising one or more solar panels.

17. The UTV of claim 16, wherein the one or more solar panels is configured to recharge the accessory battery and to provide power to the one or more accessories.

18. The UTV of claim 10, wherein the first motor gearbox assembly is positioned proximate a front end of the UTV and configured to power a pair of front wheels, and the second motor gearbox assembly is positioned proximate a rear end of the UTV and configured to power a pair of rear wheels.

* * * * *